(12) United States Patent
Ferson et al.

(10) Patent No.: US 12,151,682 B2
(45) Date of Patent: Nov. 26, 2024

(54) ADAPTIVE CRUISE CONTROL METHOD AND SYSTEM

(71) Applicant: TOYOTA MOTOR EUROPE, Brussels (BE)

(72) Inventors: Niels Ferson, Brussels (BE); Florent Garnier-Follet, Brussels (BE); Edoardo Pizzigoni, Brussels (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 283 days.

(21) Appl. No.: 17/628,821

(22) PCT Filed: Jul. 29, 2019

(86) PCT No.: PCT/EP2019/070320
§ 371 (c)(1),
(2) Date: Jan. 20, 2022

(87) PCT Pub. No.: WO2021/018374
PCT Pub. Date: Feb. 4, 2021

(65) Prior Publication Data
US 2022/0258735 A1    Aug. 18, 2022

(51) Int. Cl.
*B60W 30/16* (2020.01)
*B60W 10/06* (2006.01)
(Continued)

(52) U.S. Cl.
CPC ............ *B60W 30/16* (2013.01); *B60W 10/06* (2013.01); *B60W 10/18* (2013.01); *B60W 40/04* (2013.01);
(Continued)

(58) Field of Classification Search
CPC ...... B60W 30/16; B60W 10/06; B60W 10/18; B60W 40/04; B60W 40/09; B60W 40/105;
(Continued)

(56) References Cited

U.S. PATENT DOCUMENTS 6,418,370 B1 * 7/2002 Isogai .................... G08G 1/166
340/904
2006/0111831 A1    5/2006 Sekiguchi
(Continued)

FOREIGN PATENT DOCUMENTS

JP    2009166727 A  *  7/2009
JP    2010143323 A     7/2010
WO   2007042988 A1    4/2007

OTHER PUBLICATIONS

English machine translation (JP-2009166727-A) (Year: 2009).*
International Search Report and Written Opinion dated May 6, 2020 in related International Application No. PCT/EP2019/070320.

*Primary Examiner* — Anshul Sood
*Assistant Examiner* — Micah Chuen-Him Cheng
(74) *Attorney, Agent, or Firm* — Dinsmore & Shohl LLP (57) ABSTRACT

An adaptive cruise control method for a driving vehicle includes acquiring the speed of the driving vehicle, acquiring the relative distance between the driving vehicle and the preceding vehicle driving in the same lane in front of the driving vehicle, calculating a target time headway, the time headway being the ratio between the relative distance and the driving vehicle speed, on the basis of a relationship linking the target time headway with the driving vehicle speed, and controlling, as a first control mode, the engine and/or the brake of the driving vehicle on the basis of the target time headway.

9 Claims, 5 Drawing Sheets

(51) Int. Cl.
*B60W 10/18* (2012.01)
*B60W 40/04* (2006.01)
*B60W 40/09* (2012.01)
*B60W 40/105* (2012.01)

(52) U.S. Cl.
CPC .......... *B60W 40/09* (2013.01); *B60W 40/105* (2013.01); *B60W 2520/10* (2013.01); *B60W 2554/802* (2020.02); *B60W 2554/804* (2020.02)

(58) Field of Classification Search
CPC ....... B60W 2520/10; B60W 2554/802; B60W 2554/804; B60W 10/184
See application file for complete search history.

(56) References Cited

U.S. PATENT DOCUMENTS

| | | |
|---|---|---|
| 2009/0157276 A1 | 6/2009 | Kade |
| 2010/0198478 A1 | 8/2010 | Shin |
| 2018/0037227 A1 | 2/2018 | Jovin et al. |
| 2020/0086749 A1* | 3/2020 | Suzuki .................... B60L 50/61 |

* cited by examiner

ADAPTIVE CRUISE CONTROL METHOD AND SYSTEM

CROSS-REFERENCE TO RELATED APPLICATION

This application is a national phase of International Application No. PCT/EP2019/070320 filed on Jul. 29, 2019, the entire contents of which are herein incorporated by reference.

TECHNICAL FIELD

The present disclosure relates to an adaptive cruise control method for a driving vehicle, an adaptive cruise control system for a driving vehicle, a vehicle comprising such a control system, a computer program comprising instructions for executing the steps of such a method, and a recording medium having recorded thereon such a computer program.

Such an adaptive cruise control method is useful to adapt the distance to a preceding vehicle during automated driving in a natural manner. Such an adaptive cruise control can be used for any driving vehicle, fully automated or simply equipped with a cruise control system.

TECHNOLOGICAL BACKGROUND

Cruise control systems are well known systems that automatically control the speed of a motor vehicle to maintain a steady speed as set by the driver. Such a system, implemented in most of the modern cars, provides the driver with a substantial drive comfort, especially when driving on highways.

However, the first generations of such systems had the drawback of maintaining the speed steady regardless the presence of another vehicle preceding the driving vehicle in the same lane. Therefore, in order to avoid hitting the preceding vehicle, the driver of the driving vehicle had to manually brake, thus cancelling the operation of the cruise control.

In order to avoid such a drawback, adaptive cruise control systems have been more recently designed: such systems are able to detect a preceding vehicle and to adjust the speed of the driving vehicle so as to follow the preceding vehicle at a safe distance. Therefore, when no preceding vehicle is detected, the speed of the driving vehicle is maintained steady at the set speed; then, when a preceding vehicle is detected, the speed of the driving vehicle is reduced so as to safely follow the preceding vehicle; in the end, when the preceding vehicle leaves the lane or accelerates and is not detected anymore, the speed of the driving vehicle is increased to reach the set speed again.

However, while such adaptive cruise control systems have effectively improved the driving safety, the drivers are not totally satisfied with the currently available adaptive cruise control systems. Indeed, it has been observed that the current systems do not mimic actual natural following behavior. Particularly, in the current systems, the target following distance is retrieved from a target following distance map; however, this map does not accurately mimic the behavior of actual drivers when they are following a preceding vehicle.

Consequently, the driver is not completely at ease when the adaptive cruise control system follows a preceding vehicle. As a result, the safety feeling and the driving comfort is not totally satisfactory.

As a result, there is a real need for an adaptive cruise control method, an adaptive cruise control system, a vehicle, a computer program and a recording medium which are, at least partly, devoid of the drawbacks of the above mentioned known systems.

SUMMARY

The present disclosure relates to an adaptive cruise control method for a driving vehicle, comprising the steps of: acquiring the speed of the driving vehicle, acquiring the relative distance between the driving vehicle and the preceding vehicle driving in the same lane in front of the driving vehicle, calculating a target time headway, the time headway being the ratio between the relative distance and the driving vehicle speed, on the basis of a relationship linking the target time headway with the driving vehicle speed, and controlling, as a first control mode, the engine and/or the brake of the driving vehicle on the basis of the target time headway.

Therefore, in the present disclosure, the following behaviour of the adaptive cruise control is not based on a predetermined map of following distances but on the calculation of a target time headway. Indeed, it has been determined by the inventors that such a target time headway, which is basically the time separating both vehicles, is a more relevant parameter to be monitored than the relative distance.

Particularly, the inventors have carried out a detailed statistically study based on more than 100,000 real following cases to understand the natural following behaviour of real drivers. Thanks to this study, the inventors have identified common trends in the analysed following cases and have designed relationships to mimic such a natural following behaviour.

Therefore, such a relationship linking the target time headway enables to accurately mimic the natural following behaviour. Consequently, this results in a natural feeling for the driver when the vehicle is controlled on the basis of such a relationship and, thus, in an increased confidence of the driver, but also of the passengers, in the automated driving system. As a result, thanks to this adaptive cruise control method, the safety feeling and the driving comfort is increased.

In some embodiments, the relationship linking the target time headway with the driving vehicle speed is of the following type:

$$THW_t = a \cdot S^{-b} + c$$

where $THW_t$ is the target time headway,
S is the driving vehicle speed, and
a, b and c are positive real numbers.

This relationship enables to mimic with a high accuracy the natural following behaviour of real drivers, as identified in the statistical study carried out by the inventors.

In some embodiments, in the relationship $THW_t = a \cdot S^{-b} + c$, the term b lies between 0.5 and 1, preferably between 0.6 and 0.8.

In some embodiments, in the relationship $THW_t = a \cdot S^{-b} + c$, the term a lies between 1 and 20, preferably between 4 and 13.

In some embodiments, in the relationship $THW_t = a \cdot S^{-b} + c$, the term c lies between 0.1 and 1.5, preferably between 0.2 and 1.1.

In some embodiments, the relationship linking the target time headway with the driving vehicle speed includes at least a term determined on the basis of a behaviour factor which is adjustable in accordance with the behaviour of the driver. Such a behaviour factor enables to take into account the driving aggressiveness of the driver in an effort to match as close as possible the driver's natural behaviour. Accordingly, the following control is not simply based on an average driver but can mimic the behaviour of different driver profiles. Typically, a more aggressive driver is able to select an aggressive setting leading to a shorter relative distance while a less aggressive driver is able to select a safe setting leading to a longer relative distance.

In some embodiments, in the relationship $THW_t = a \cdot S^{-b} + c$, the term a and/or the term c is determined on the basis of a behaviour factor which is adjustable in accordance with the behaviour of the driver.

In some embodiments, in the relationship $THW_t = a \cdot S^{-b} + c$, the term a is determined on the basis of the following relationship $$a = m_1 \cdot B + q_1$$

where B is a behaviour factor adjustable between 0 and 100 in accordance with the behaviour of the driver, and $m_1$ and $q_1$ are positive real numbers.

In some embodiments, $m_1$ lies between 0.05 and 0.1.

In some embodiments, $q_1$ lies between 1 and 10.

In some embodiments, in the relationship $THW_t = a \cdot S^{-b} + c$, the term c is determined on the basis of the following relationship $$c = m_2 \cdot B + q_2$$

where B is a behaviour factor adjustable between 0 and 100 in accordance with the behaviour of the driver, and where $m_2$ and $q_2$ are positive real numbers.

Preferably, B is identical in both above relationships.

In some embodiments, $m_2$ lies between 0.001 and 0.02.

In some embodiments, $q_2$ lies between 0.1 and 1.

In some embodiments, the behaviour factor is set by the driver. For instance, 4 settings are available.

In some embodiments, the behaviour factor is set by the central control unit of the vehicle, based for example on the driving history of the driver.

In some embodiments, the method further comprises the step of acquiring the speed of the preceding vehicle. Accordingly, it is possible to determine whether the preceding vehicle is driving slower or faster than the driving vehicle.

In some embodiments, the first control mode is selected only if the preceding vehicle speed is substantially equal to the driving vehicle speed. Particularly, it may be determined that the preceding vehicle speed is substantially equal to the driving vehicle speed if the preceding vehicle speed is equal to the driving vehicle speed at more or less 2 km/h. The accuracy of the designed relationship is indeed at its highest level when both vehicles truly follow one after the other at the same pace.

In some embodiments, the engine and/or the brake of the driving vehicle are controlled under a second control mode when the preceding vehicle speed is at least 2 km/h lower than the driving vehicle speed.

In some embodiments, under the second control mode, the driving vehicle speed is decreased until the driving vehicle speed substantially matches the preceding vehicle speed. Accordingly, when a preceding vehicle is detected, the driving vehicle can be decelerated to reach a following situation in which the first control mode can be used.

In some embodiments, the engine and/or the brake of the driving vehicle are controlled under a third control mode when the preceding vehicle speed is at least 2 km/h higher than the driving vehicle speed or when no preceding vehicle is detected. For example, in such a situation, the regular cruise control can be resumed.

In some embodiments, under the third control mode, the driving vehicle speed is increased then kept constant at a target speed. This target speed can be set by the driver or by the central control unit of the vehicle, on the basis of traffic information for example.

In some embodiments, relative distance is acquired by a millimetre-wave radar, a camera and/or a lidar.

In some embodiments, under the first control mode, no map of relative distance depending on the driving vehicle speed is used.

The present disclosure also relates to an adaptive cruise control system for a driving vehicle, comprising: a driving vehicle speed determination unit, configured to determine the speed of the driving vehicle, a relative distance determination unit, configured to determine the relative distance between the driving vehicle and the preceding vehicle driving in the same lane in front of the driving vehicle, a calculation unit, configured to calculate a target time headway, the time headway being the ratio between the relative distance and the driving vehicle speed, on the basis of a relationship linking the target time headway with the driving vehicle speed, and a control unit, comprising at least a first control mode wherein the engine and/or the brake of the driving vehicle are controlled on the basis of the target time headway.

Of course, this adaptive cruise control system can comprise means configured for implementing any embodiment of the above method.

The present disclosure also relates to a vehicle, comprising the above adaptive cruise control system.

The present disclosure also relates to a computer program comprising instructions for executing the steps of any embodiment of the above method when the program is executed by a computer.

This program can use any programming language and take the form of source code, object code or a code intermediate between source code and object code, such as a partially compiled form, or any other desirable form.

The present disclosure also relates to a recording medium readable by a computer and having recorded thereon the above computer program.

The recording medium can be any entity or device capable of storing the program. For example, the medium can include storage means such as a ROM, for example a CD ROM or a microelectronic circuit ROM, or magnetic storage means, for example a diskette (floppy disk) or a hard disk.

Alternatively, the recording medium can be an integrated circuit in which the program is incorporated, the circuit being adapted to execute the method in question or to be used in its execution.

The above mentioned features and advantages, and others, will become apparent when reading the following detailed description of exemplary embodiments of the presented adaptive cruise control method and system. This detailed description refers to the accompanying drawings.

BRIEF DESCRIPTION OF THE DRAWINGS

The accompanying drawings are diagrammatic and seek above all to illustrate the principles of the present disclosure.

DETAILED DESCRIPTION

In order to make the present disclosure more concrete, an exemplary embodiment of the presented adaptive cruise control method and system is described in detail below with reference to the accompanying drawings. It should be recalled that the present disclosure is not limited to this example.

Figure 1:
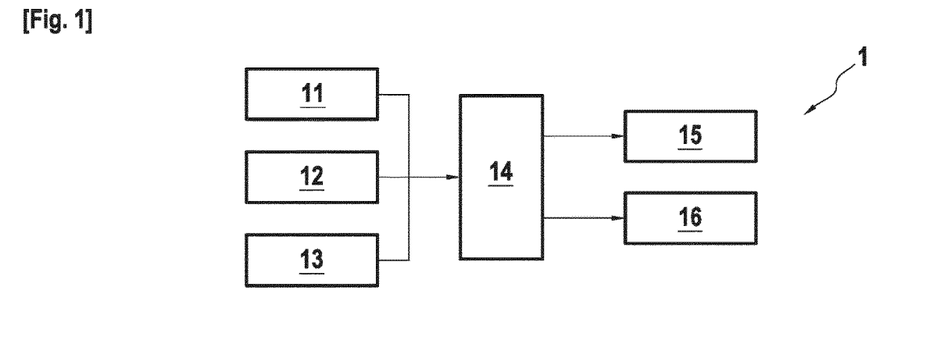
FIG. 1 illustrates an adaptive cruise control system according to the disclosure.

FIG. 1 illustrates an exemplary adaptive cruise control system 1 for a driving vehicle such as a private car. It comprises a millimeter-wave radar 11, a driving vehicle speed sensor 12, a behavior setting unit 13, a cruise control unit 14, an engine 15 and a brake 16.

The millimeter-wave radar 11 is configured to measure the speed $S_{pv}$ of the preceding vehicle, that is to say the vehicle driving in front of the driving vehicle in the same lane, together with the relative distance D between the driving vehicle and the preceding vehicle.

The driving vehicle speed sensor 12 is configured to measure the speed S of the driving vehicle.

The behavior setting unit 13 is configured to determine and save the behavior setting. In the present example, such a behavior setting is selected by the driver thanks to a human-machine interface. Four predetermined settings are available: "far"; "middle far"; "middle close" and "close".

The operation of the cruise control unit 14 will now be described. The cruise control unit 14 is an electronic control unit configured to send control instructions to the engine 15 and the brake 16 on the basis of inputs from the millimeter-wave radar 11, the driving vehicle speed sensor 12 and the behavior setting unit 13.

For doing so, one function of the cruise control unit 14 is to calculate the time headway THW between the driving vehicle and the preceding vehicle, such time headway THW being the ratio between the relative distance D and the driving vehicle speed S (i.e. THW=D/S).

Three control modes are programmed in the cruise control unit 14 and are selected in accordance with relative speed between the driving vehicle and the preceding vehicle:

- when this relative speed is equal to 0±2 km/h, the cruise control unit 14 uses a first control mode;
- when this relative speed is greater than 2 km/h (i.e. the preceding vehicle speed $S_{pv}$ is at least 2 km/h lower than the driving vehicle speed S), the cruise control unit 14 uses a second control mode; and
- when this relative speed is lower than 2 km/h (i.e. the preceding vehicle speed $S_{pv}$ is at least 2 km/h higher than the driving vehicle speed S), the cruise control unit 14 uses a third control mode.

Also, when no preceding vehicle is detected, the cruise control unit 14 uses the third control mode.

Figure 2:
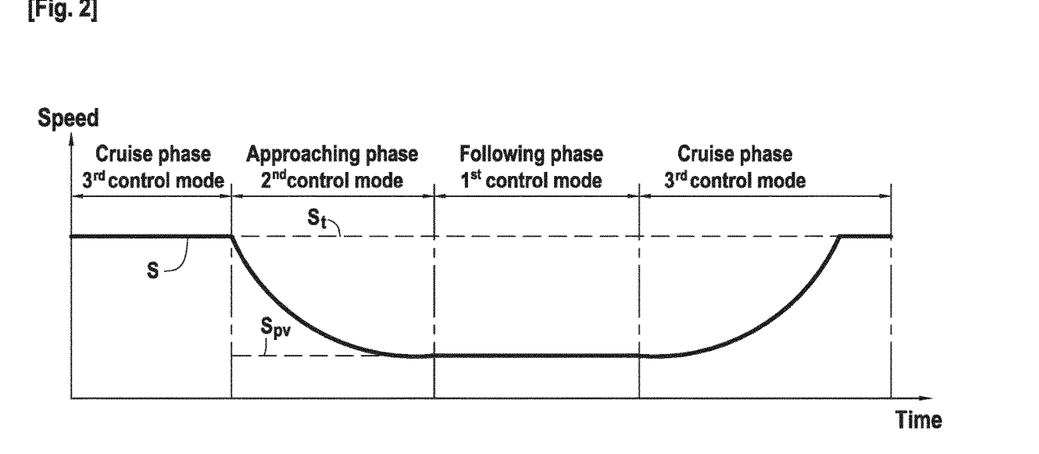
FIG. 2 is a timeline of the driving vehicle speed for a typical scenario.
Figure 3:
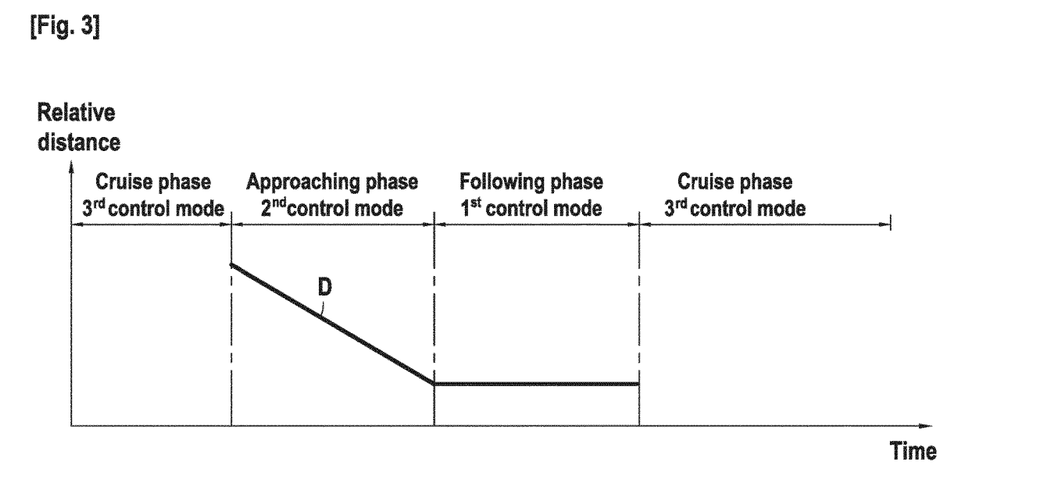
FIG. 3 is a timeline of the relative distance for this scenario.

In this respect, FIGS. 2 and 3 illustrate a typical scenario where the driving vehicle meets a preceding vehicle.

At the start of the scenario, no preceding vehicle is detected, either because no preceding vehicle is indeed present in the same lane in front of the driving vehicle or because the preceding vehicle is beyond the detection range of the millimeter-wave radar 11 and is therefore far enough from the driving vehicle to be ignored. Therefore, in this cruise phase, the third control mode is selected and the driving vehicle speed S is controlled to match a target steady speed $S_t$ set by the driver. Also, the relative distance D between the driving vehicle and the preceding vehicle cannot be defined since no preceding vehicle is detected.

Then, a preceding vehicle is detected, either because a vehicle enters the lane in front of the driving vehicle or because a slower preceding vehicle, caught-up by the driving vehicle, enters the detection range of the millimeter-wave radar 11. The speed $S_{pv}$ of this preceding vehicle is at least 2 km/h lower than the driving vehicle speed S. Therefore, in this approaching phase, the second control mode is selected and the driving vehicle speed S is decreased to reach the preceding vehicle speed $S_{pv}$. Consequently, the relative distance D is steadily decreased during the approaching phase.

Then, as soon the driving vehicle speed S reaches the preceding vehicle speed Spy at more or less 2 km/h, the following phase starts and the first control mode is selected. This first control mode will now be described in greater details.

Under the first control mode, a target time headway $THW_t$ is calculated as a function of the driving vehicle speed S thanks to the following relationship:

$$THW_t = a \cdot S^{-0.71} + c$$

In this relationship, a and c are real numbers determined as a function of a behavior factor B, comprised between 0 and 100, based on the behavior setting saved by the behavior setting unit 13:

$$a = 0.078B + 4.482 \text{ and}$$

$$c = 0.008B + 0.232$$

In the present example, the behavior factor 5 is associated with the behavior setting "far"; the behavior factor 25 is associated with the behavior setting "middle far"; the behavior factor 50 is associated with the behavior setting "middle close"; and the behavior factor 75 is associated with the behavior setting "close".

Figure 4:
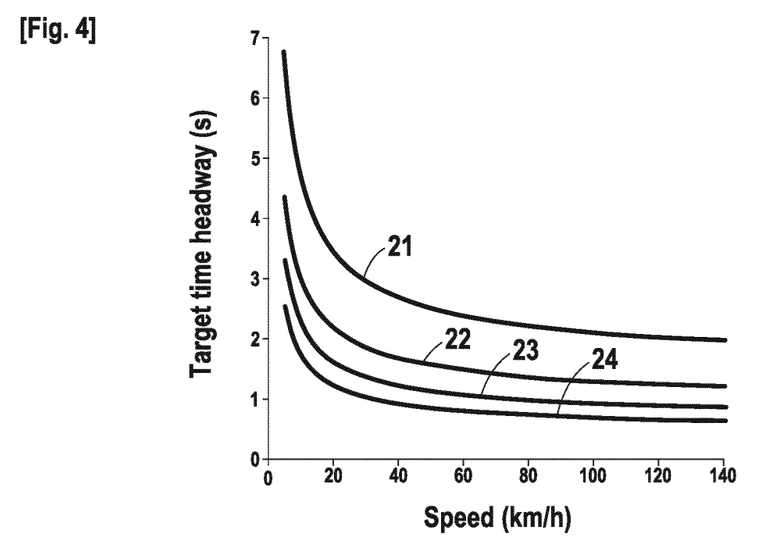
FIG. 4 is a graph of the target time headway as a function of the driving vehicle speed.

FIG. 4 illustrates this relationship between the target time headway $THW_t$ and the driving vehicle speed S for the four suggested behavior settings: "far" 21; "middle far" 22; "middle close" 23 and "close" 24.

Figure 5:
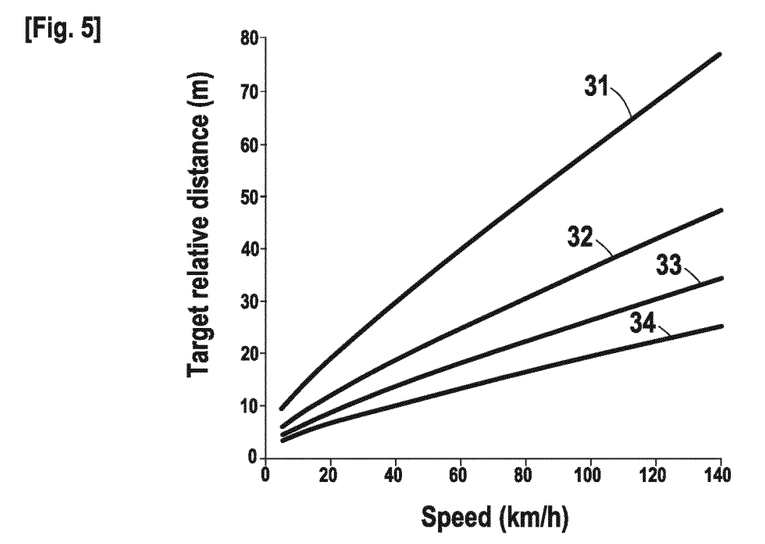
FIG. 5 is a graph of the relative distance as a function of the driving vehicle speed.

FIG. 5 illustrates the target relative distance $D_t$, corresponding therefore to a target following distance, which can be deduced from the above target time headway $THW_t$ and the driving vehicle speed S for the four suggested behavior settings: "far" 31; "middle far" 32; "middle close" 33 and "close" 34.

Consequently, under the first control mode, the cruise control unit 14 controls the engine 15 and the brake 16 so that the actual time headway THW meets the target time headway $THW_t$.

Finally, when the preceding vehicle leaves the lane, leaving the lane in front of the driving empty within the millimeter-wave radar 11 range, the cruise control unit 14 reverts to the first control mode. Therefore, the driving vehicle speed in increased then kept constant at the target speed $S_t$ (see FIG. 3).

The results of a statistical study made by the inventors will now be described in order to evidence the accuracy of the above relationship linking the target time headway $THW_t$ with the driving vehicle speed S.

This study is based on driving data collected through the EuroFOT project: such data include 13 407 driving hours, of 38 non-professional European drivers, for 581,347 km. Scene detection criteria have been applied on these data to identify and extract following scenes: particularly, relative speed is within ±2 km/h and driving vehicle acceleration is within ±0.2 m/s². Therefore, 125,441 following scenes have been detected.

Due to the limited amount of data extractable from the EuroFOT database, only a part of the detected following scenes were kept extracted: specifically, around 3,700 scenes for each 10 km/h range until 130 km/h were kept, plus all the scenes beyond 130 km/h (around 2,000 cases). Thus, after cutting the data, 50,745 scenes were kept and studied.

At that stage, the inventors noticed that some scenes exhibited a high time headway THW ($90^{th}$ percentile at 3.3 s) and/or a high relative distance D ($90^{th}$ percentile at 69 m) and had concern that some extracted scenes would in the end not be actual following cases. Particularly, on the basis of the original set of extracted scenes, the inventors noticed that the time headway THW suddenly get higher when the driving vehicle speed was higher for a large part of these scenes, evidencing that such scenes were not actual following cases where the preceding vehicle actually influences the behavior of the driving vehicle.

Therefore, the inventors have made the assumption that if the preceding vehicle speed influences the driving vehicle speed, that is to say if the scene is an actual following case, then a change in the preceding vehicle speed will result in a change in the driving vehicle speed. As a result, they carried out a second selecting based on additional conditions satisfying the above assumption: particularly, the preceding vehicle had a change of speed of at least ±4 km/s and the driving vehicle reacted from −2 to 5 s of the preceding vehicle speed change by changing its speed by also ±4 km/h. Thus, under these additional conditions, 20,046 verified following scenes were kept.

Figure 6:
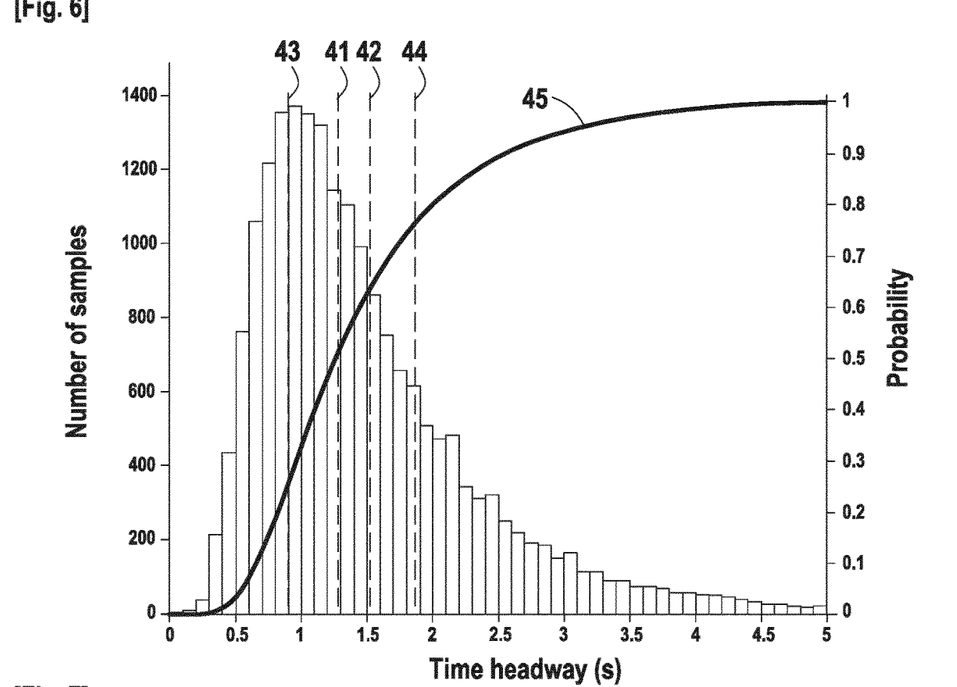
FIG. 6 is the distribution of the time headway coming from a statistical study.
Figure 7:
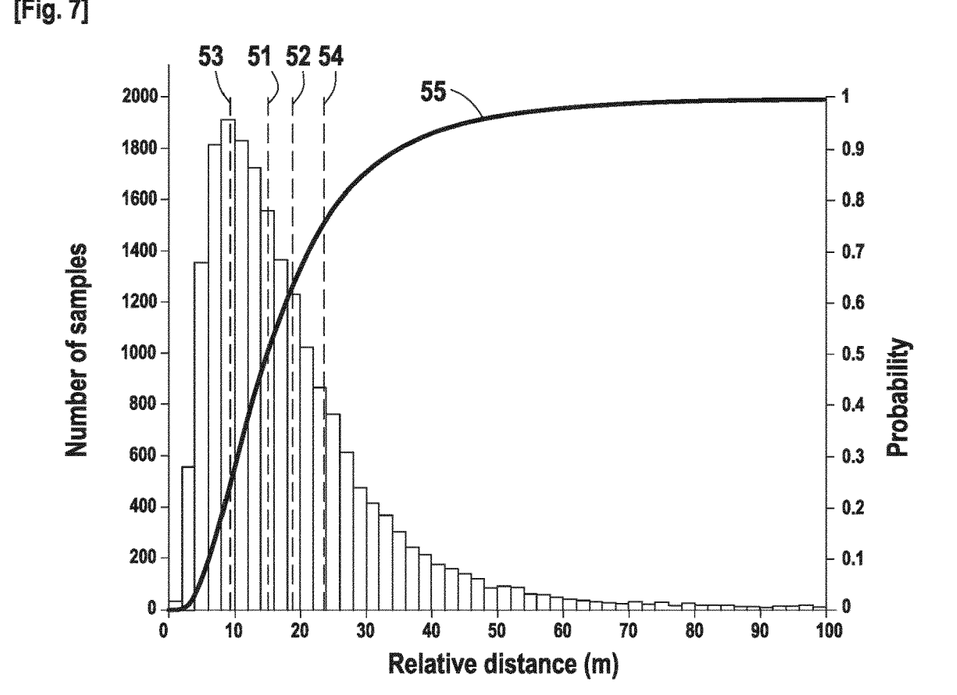
FIG. 7 is the distribution of the relative distance coming from the statistical study.

FIGS. 6 and 7 illustrate the distributions of the verified scenes for the time headway THW and the relative distance D, respectively. As regards the time headway THW, the median 41 is 1.28 s, the mean 42 is 1.52 s, the $25^{th}$ percentile 43 is 0.9 s and the $75^{th}$ percentile 44 is 1.86 s; the cumulative distribution 45 is also depicted. As regards the relative distance D, the median 51 is 15 m, the mean 52 is 18.78 m, the $25^{th}$ percentile 53 is 9.29 m and the $75^{th}$ percentile 54 is 23.5 m; the cumulative distribution 55 is also depicted.

Figure 8:
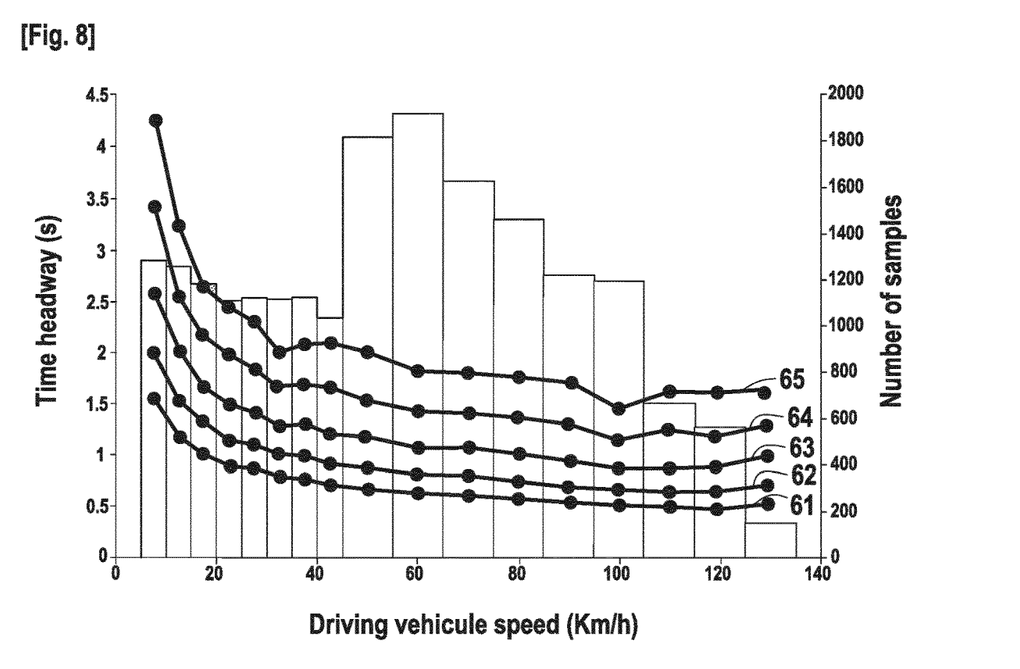
FIG. 8 illustrates the results of the statistical study for the time headway.

Now, FIG. 8 depicts for each 5 km/h range from 5 km/h to 45 km/h, and for each 10 km/h range from 45 km/h to 135 km/h, the number of verified samples in this speed range and the value of the time headway THW for several percentiles: $10^{th}$ percentile 61, $25^{th}$ percentile 62, $50^{th}$ percentile 63, $75^{th}$ percentile 64 and $90^{th}$ percentile 65.

Figure 9:
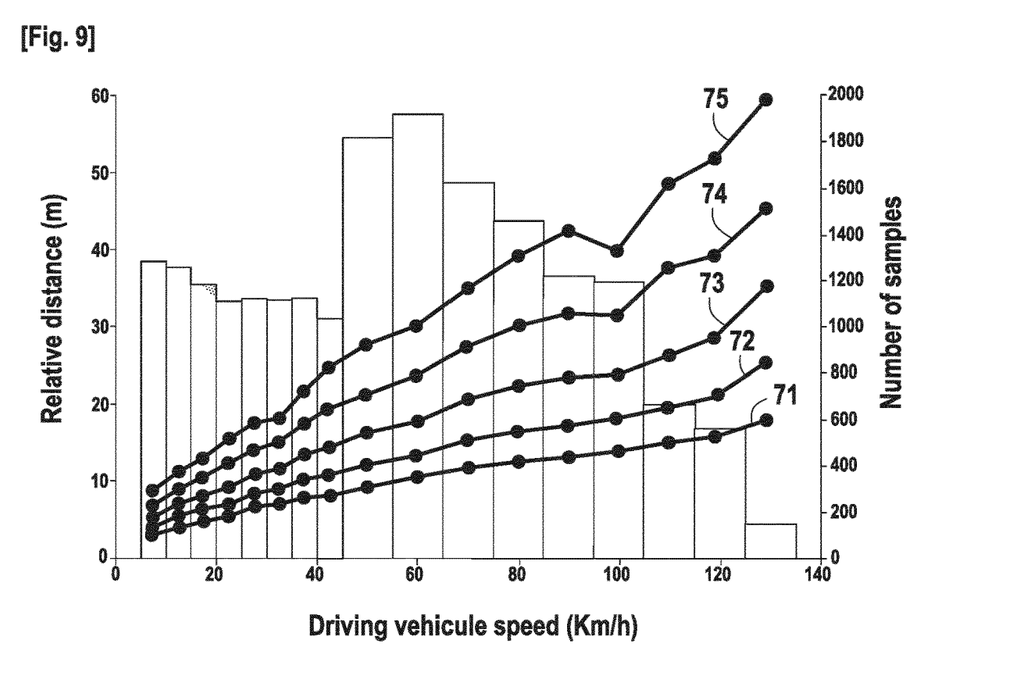
FIG. 9 illustrates the results of the statistical study for the relative distance.

Similarly, FIG. 9 depicts for each 5 km/h range from 5 km/h to 45 km/h, and for each 10 km/h range from 45 km/h to 135 km/h, the number of verified samples in this speed range and the value of the relative distance D for several percentiles: $10^{th}$ percentile 71, $25^{th}$ percentile 72, $50^{th}$ percentile 73, $75^{th}$ percentile 74 and $90^{th}$ percentile 75.

It appears therefore that the curves 21-24 of the target time headway $THW_t$ calculated thanks to the relationship designed by the inventors accurately match the profiles of the curves 61-65 of the actual time headway THW revealed by this statistical survey.

Similarly, the curves 31-34 of the target relative distance $D_t$ deduced from the relationship designed by the inventors accurately match the profiles of the curves 71-75 of the actual relative distance D revealed by this statistical survey.

Particularly, the overall accuracy of the relationship designed by the inventors have been measured though the coefficient of determination method on the one hand and the root-mean-square error method on the other hand. At this occasion, it should be noted that the designed model relationship has been fitted so that the behavior factor B corresponds to the percentile of the statistical distribution. Put another way, the model relationship with the behavior factor B is designed to fit the actual statistical results for the $B^{th}$ percentile.

Figure 10:
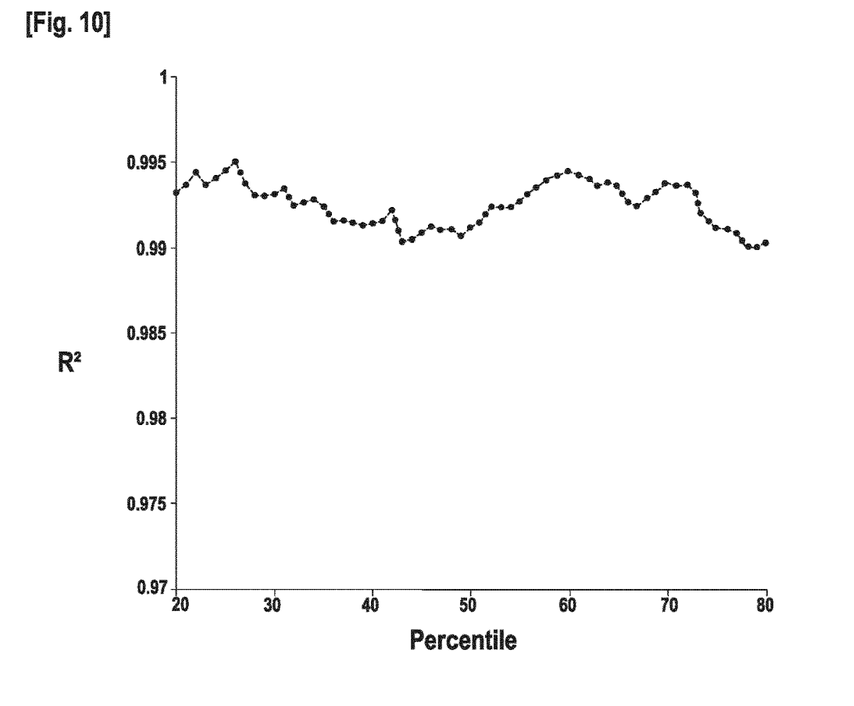
FIGS. 10 and 11 are graphs illustrating the accuracy of the presented model.
Figure 11:
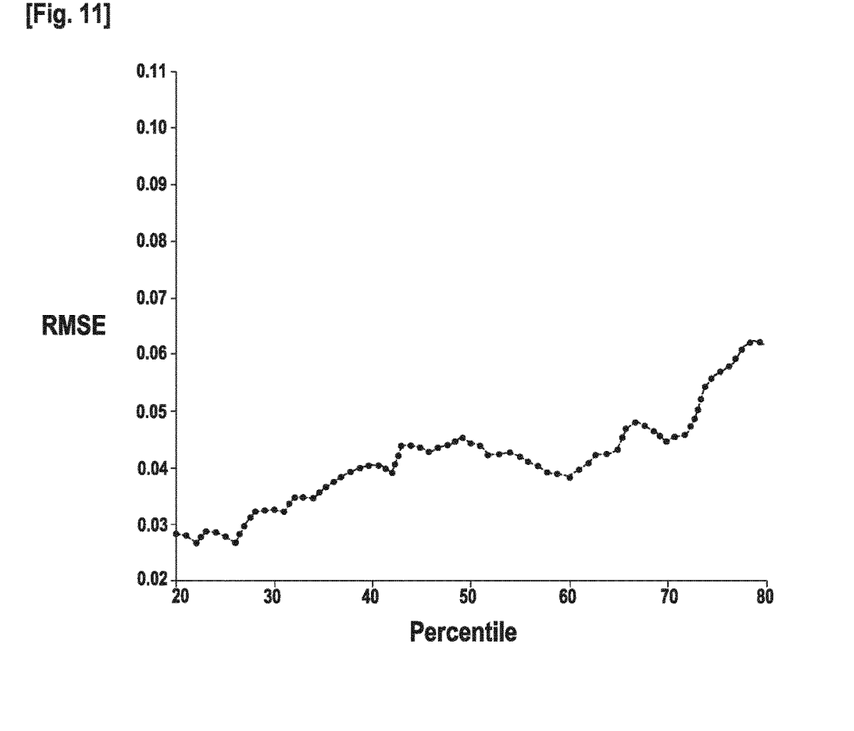

Thus, FIG. 10 depicts, for each percentile between 20 and 80, the coefficient of determination ($R^2$) of the model relationship with respect to the actual statistical data: it appears therefore that these coefficients of determination are greater than 0.99 for every percentile. Also, FIG. 11 depicts, for each percentile between 20 and 80, the root-mean-square error (RMSE) of the model relationship with respect to the actual statistical data: put in another way, this error corresponds to the error made on the time headway THW value. It appears therefore that the greatest error is hardly greater than 0.06 s.

Even if the present disclosure has been described with regard to particular exemplary embodiments, it is clear that these examples may be modified without departing from the scope of the subject matter as defined by the claims. Particularly, individual features of different presented embodiments can be combined in additional embodiments. As a result, the description and the drawings shall be considered in an illustrative way rather than a limitative way.

It is also clear that all the features described with reference to a method are transposable, individually or in combination, to a device, and vice versa.

The invention claimed is:

1. An adaptive cruise control method for a driving vehicle, comprising the steps of:

acquiring a driving vehicle speed of the driving vehicle, acquiring a relative distance between the driving vehicle and a preceding vehicle driving in the same lane in front of the driving vehicle, calculating a target time headway, the target time headway being a ratio between the relative distance and the driving vehicle speed, on the basis of a relationship linking the target time headway with the driving vehicle speed, and controlling, as a first control mode, an engine and/or a brake of the driving vehicle on the basis of the target time headway, wherein the relationship linking the target time headway with the driving vehicle speed is of the following type:

$THW_t = a \cdot S^{-b} + c$ where $THW_t$ is the target time headway,

S is the driving vehicle speed, a, b and c are positive real numbers, and wherein, in the relationship $THW_t = a \cdot S^{-b} + c$, the terms a and c are determined on the basis of the following relationships:

$a = m_1 \cdot B + q_1$, and $c = m_2 \cdot B + q_2$ where B is a behaviour factor adjustable between 0 and 100 in accordance with behaviour of a driver, $m_1$ and $q_1$ are positive real numbers, and $m_2$ and $q_2$ are positive real numbers.

2. The method of claim 1, wherein, in the relationship $THW_t = a \cdot S^{-b} + c$, the term b lies between 0.5 and 1.

3. The method of claim 1, wherein the relationship linking the target time headway with the driving vehicle speed includes at least a term determined on the basis of a behaviour factor which is adjustable in accordance with behaviour of a driver.

4. The method of claim 1, further comprising the step of acquiring a preceding vehicle speed of the preceding vehicle, and
wherein the first control mode is selected only if the preceding vehicle speed is substantially equal to the driving vehicle speed.

5. The method of claim 4, wherein the engine and/or the brake of the driving vehicle are controlled under a third control mode when the preceding vehicle speed is at least 2 km/h higher than the driving vehicle speed or when no preceding vehicle is detected, and
wherein, under the third control mode, the driving vehicle speed is increased then kept constant at a target speed.

6. The method of claim 1, wherein $q_1$ is greater than 1 and/or $q_2$ is greater than 0.1.

7. An adaptive cruise control system for a driving vehicle, comprising:
a driving vehicle speed sensor, configured to determine a driving vehicle speed of the driving vehicle,
a millimeter-wave radar, configured to determine a relative distance between the driving vehicle and a preceding vehicle driving in the same lane in front of the driving vehicle,
an electronic control unit, configured to calculate a target time headway, the target time headway being a ratio between the relative distance and the driving vehicle speed, on the basis of a relationship linking the target time headway with the driving vehicle speed, and
the electronic control unit comprising at least a first control mode wherein an engine and/or a brake of the driving vehicle are controlled on the basis of the target time headway, wherein the relationship linking the target time headway with the driving vehicle speed is of the following type:
$THW_t = a \cdot S^{-b} + c$
where $THW_t$ is the target time headway,
S is the driving vehicle speed,
a, b and c are positive real numbers, and
wherein, in the relationship $THW_t = a \cdot S^{-b} + c$, the terms a and c are determined on the basis of the following relationships:
$a = m_1 \cdot \beta + q_1$, and
$c = m_2 \cdot B + q_2$
where B is a behaviour factor adjustable between 0 and 100 in accordance with behaviour of a driver,
$m_1$ and $q_1$ are positive real numbers, and
$m_2$ and $q_2$ are positive real numbers.

8. A vehicle, comprising the adaptive cruise control system of claim 7.

9. A non-transitory computer readable medium storing a computer program comprising instructions for executing the steps of the method of claim 1 when the program is executed by a computer.

* * * * *